Patented Apr. 1, 1924.

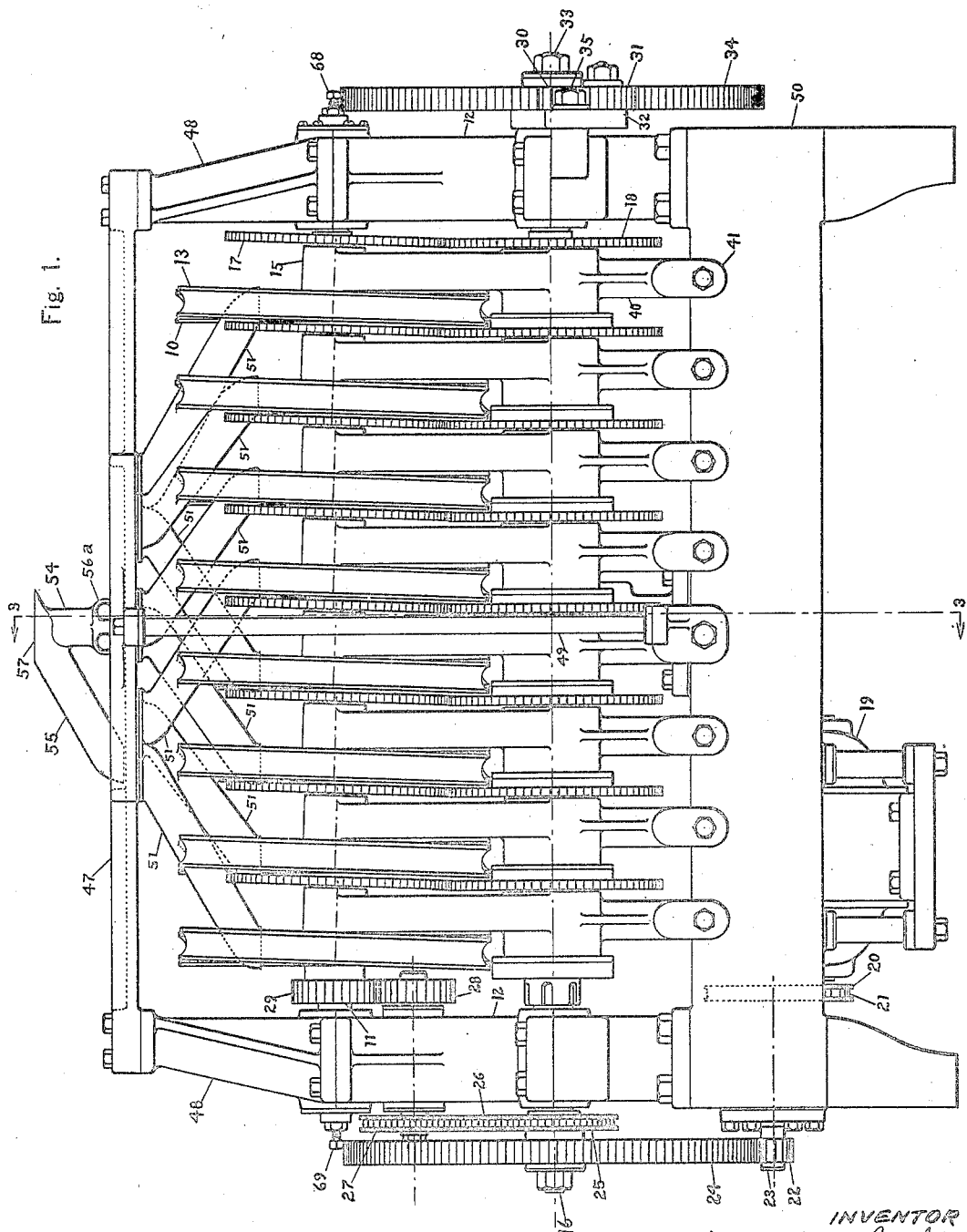

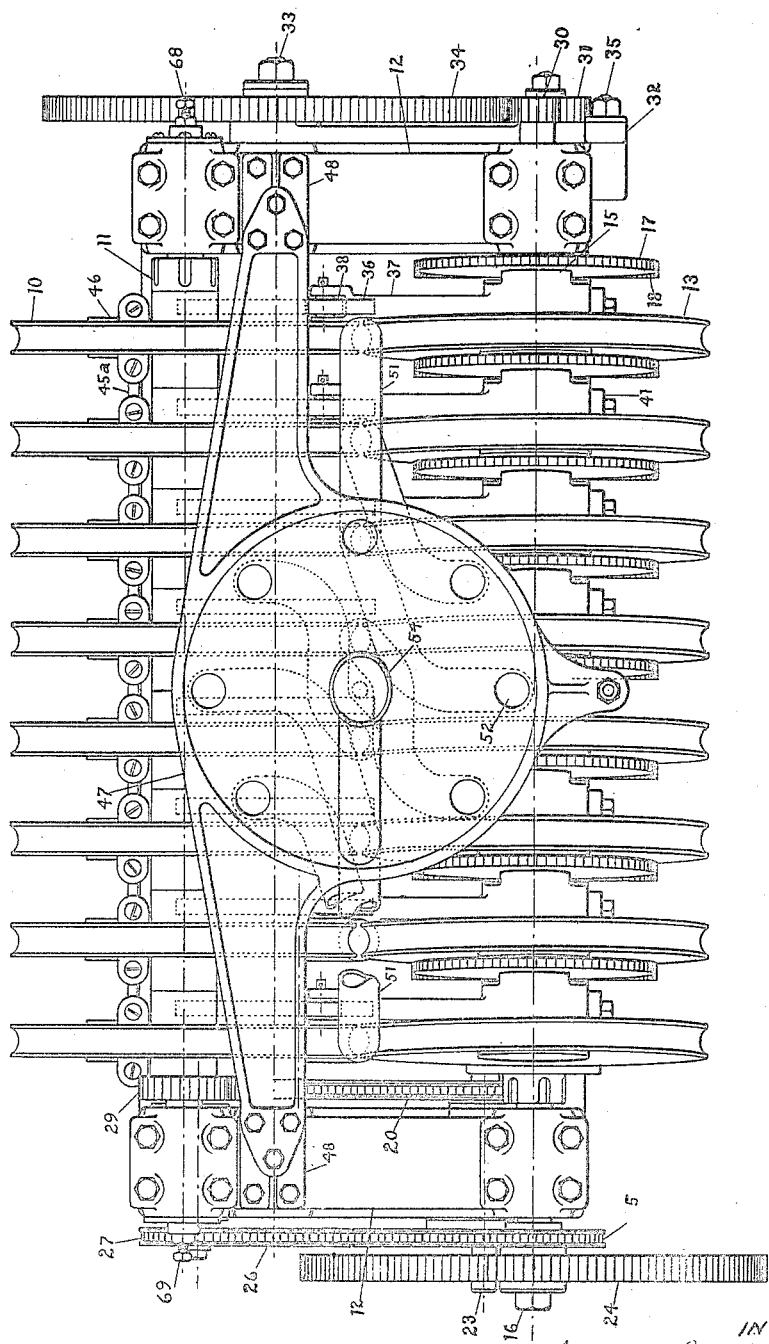

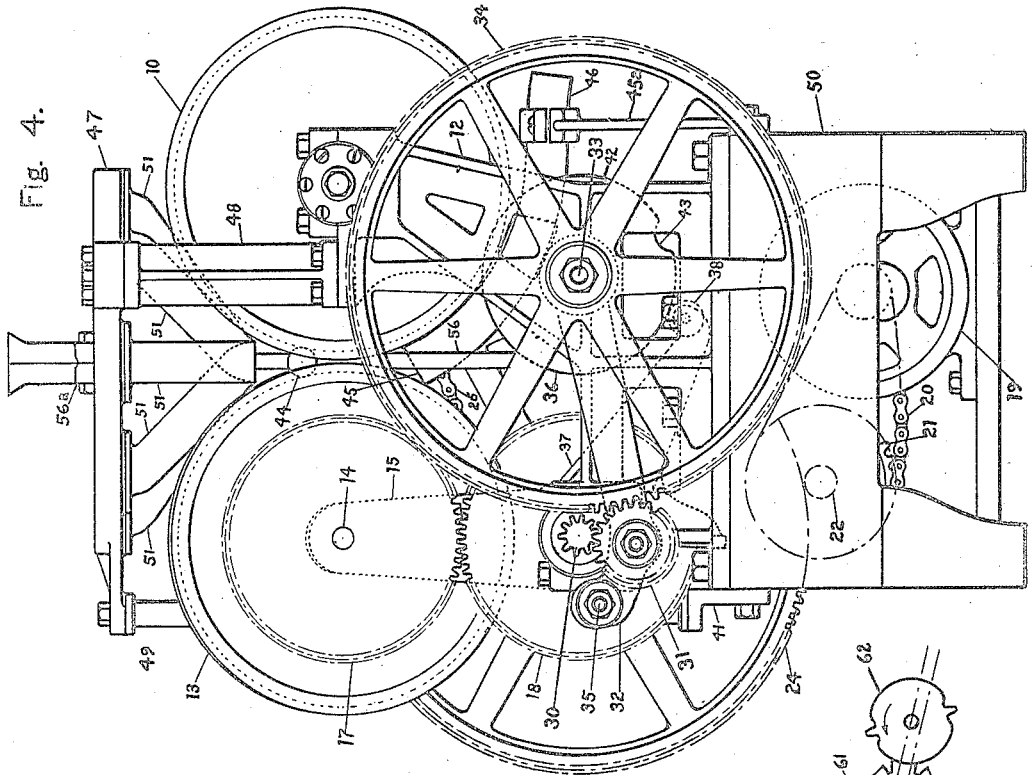

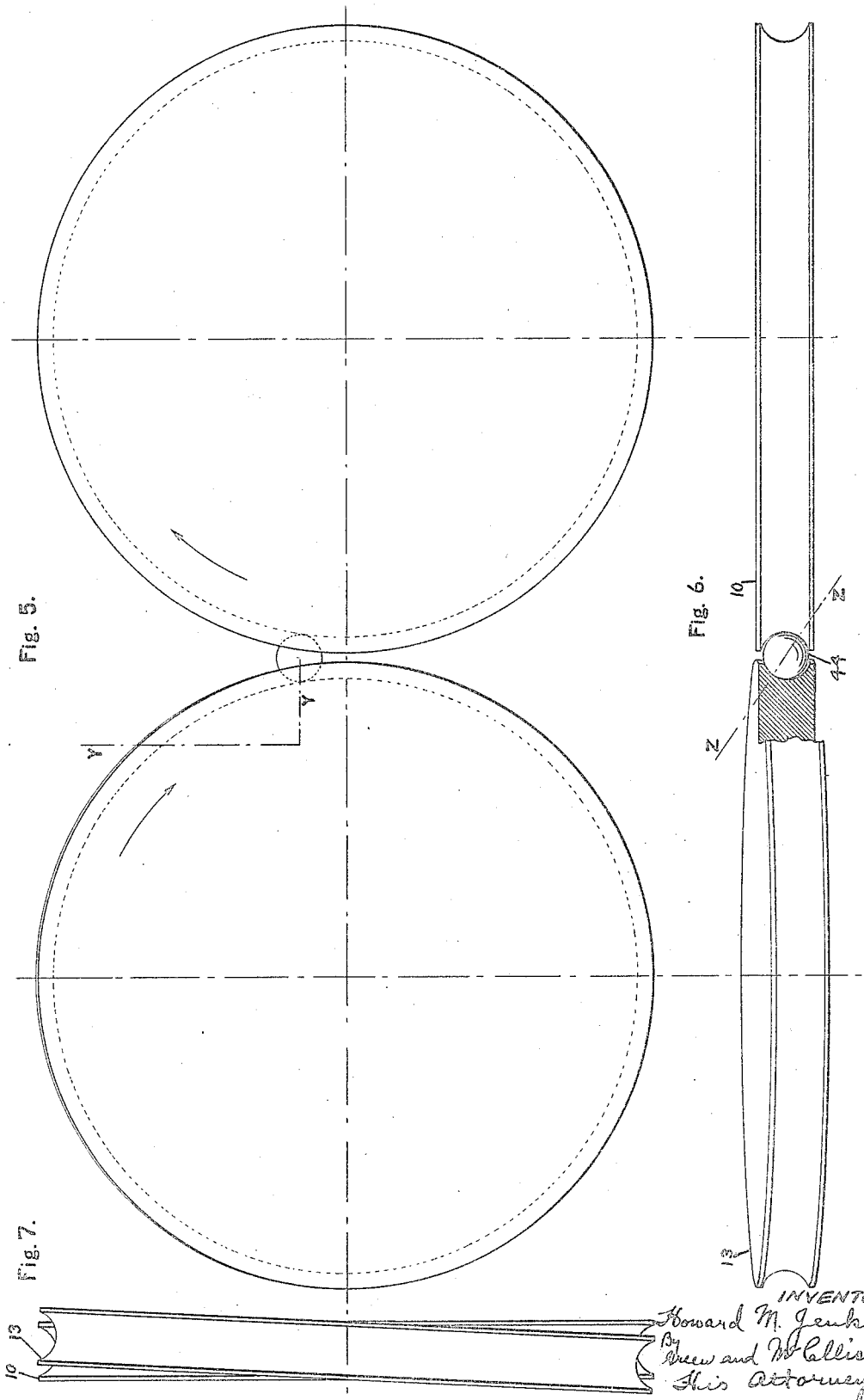

1,488,817

UNITED STATES PATENT OFFICE.

HOWARD M. JENKINS, OF PITTSBURGH, PENNSYLVANIA.

MACHINE FOR FORMING SPHERICAL BODIES.

Application filed November 11, 1922. Serial No. 600,351.

REISSUED

*To all whom it may concern:*

Be it known that I, HOWARD M. JENKINS, a citizen of the United States, and a resident of Pittsburgh, in the county of Allegheny and the State of Pennsylvania, have made a new and useful Invention in Machines for Forming Spherical Bodies, of which the following is a specification.

This invention relates to apparatus or machines for molding or otherwise forming spherical bodies, and an object of this invention is to produce such a machine or apparatus which is of simple construction.

A further object is to produce such a machine or apparatus for molding or rolling spherical bodies from plastic material.

A still further object is to produce a machine or apparatus which may be easily adjusted so as to mold or roll spherical bodies of different diameters from plastic material.

These, as well as other objects which will readily appear to those skilled in this particular art, I attain by means of the apparatus described in the specification and illustrated in the drawings accompanying and forming part of this application.

In the drawings, Figure 1 is a view in side elevation of an apparatus or machine embodying this invention. Fig. 2 is a top plan view of the same. Fig. 3 is a view in sectional elevation taken on line 3—3 of Fig. 1, looking in the direction of the arrows. Fig. 4 is a view in end elevation looking toward the left of Fig. 1. Fig. 5 is a diagrammatic view illustrating the forming wheels in side elevation and this view shows a spherical body in forming position between two co-operating forming wheels. Fig. 6 is a diagrammatic view in top plan of two co-operating forming wheels, a portion of the wheel moving downwardly at forming position being cut away as shown by lines Y—Y, Fig. 4. Line Z—Z in Fig. 6 is one of the axis lines of the spherical body being formed. Fig. 7 is a diagrammatic view in end elevation of two of the co-operating forming wheels.

The apparatus in its elemental form consists of a pair of rotating, peripherally grooved, co-operating forming wheels of different peripheral speed and having angularly disposed axes. The peripheral groove in each wheel is formed on the arc of a circle and in cross section is less than half a circle.

The wheels are so mounted that their grooves co-operate in molding or otherwise forming the material or body operated on. The axes of the wheels are disposed at a slight angle one to the other so that the body being operated on is turned on constantly changing axes of rotation whereby it is molded (when plastic material is used) into true spherical form.

The periphery of one wheel at the forming position moves upwardly while the periphery of the other moves downwardly. The peripheral speed of the wheel moving upwardly at the forming position is greater than that of the wheel moving downwardly at that position and because of this, the body being formed is maintained in proper forming position and prevented from falling between the wheels.

A distributor is used for conveying or directing the body or material to be formed to forming position between the co-operating wheels. In order to discharge the finished article, one of the forming wheels is bodily moved away from the other at a predetermined point in the cycle of operation, thereby allowing the finished article to drop through the forming wheels and be conveyed to a point outside of the machine.

The machine illustrated in the drawings, (which is chosen as the preferred embodiment of this invention) is a multiple machine in which eight sets of co-operating forming wheels are employed. The distributor for conveying bodies of material to forming position is constructed and arranged so as to distribute to the different sets of forming wheels in a certain predetermined order of rotation.

The machine comprises eight peripherally grooved forming wheels 10 keyed to a common shaft 11 mounted in suitable bearings carried by end posts 12 which form part of the frame of the machine and eight forming wheels 13 which co-operate with forming wheels 10. Each forming wheel 13 is keyed to its individual stub shaft 14 mounted in suitable bearings in the upper arm 15 of a bell crank lever loosely mounted on shaft 16.

Arm 15 of each bell crank lever (there being one for each wheel 13) is skewed so that the axis of shaft 14 stands at a slight angle to the axis of shaft 11. Shaft 14 is mounted in suitable bearings carried in the upper arm 15 of the bell crank lever and the shaft on one side of the lever carries forming wheel 13 and on the other side of the lever it carries a gear 17 which meshes with a gear 18 keyed to shaft 16.

As the bell crank lever swings about shaft 16 gear 17 rolls on gear 18.

Shaft 16 which forms the main drive shaft of the machine is driven from a motor 19 (preferably an electric motor) through drive chain 20, sprocket 21, pinion 22 mounted on the same shaft (23) as sprocket 21 and gear 24 keyed to the main drive shaft 16.

Shaft 11 to which all of the forming wheels 10 are keyed is driven from the main drive shaft 16 by means of a sprocket 25, drive chain 26, sprocket 27, gear 28, keyed to the same shaft as sprocket 27 and a gear 29 keyed to shaft 11.

The main drive shaft at its opposite end from motor 19 carries a pinion 30. This pinion is keyed to shaft 16 and is adapted to be replaced by pinions of different diameter when it is desired to change the timing of the distributor and the timing of the separation of the forming wheels for discharging the finished spheres. Pinion 30 meshes with a stub pinion 31 mounted on an arm 32 loosely carried on shaft 33 journaled in suitable bearings in the frame of the machine. Stub pinion 31 meshes with a gear 34 keyed to shaft 33 and arm 32 which carries stub gear 31 may be adjusted to different positions and locked therein by means of bolt 35 which is secured to the frame of the machine and lies within a slot formed in the outer end of arm 32.

Shaft 33 is the cam shaft since it carries a series of cams 36 (one for each bell crank lever) which are keyed to the shaft. Each of these cams is in line with the lower arm 37 of one of the bell crank levers supporting one of the forming wheels 13. The outer end of arm 37 of each bell crank lever carries an anti-friction roller 38 which is caused to bear against the peripheral face of cam 36 by means of a spring 39 positioned between a depending arm 40 of the lever and a part 41 of the frame of the machine.

The major part 42 of the peripheral face of each cam is circular and concentric with shaft 33 and the cams are of such diameter that forming wheels 13 throughout the major portion of the travel of the cams are held in forming position with relation to forming wheels 10. Each cam is provided with an indentation 43 in its peripheral face so that when the roller 38 in line with the cam is forced into this indentation by spring 39 the forming wheel 13 mounted in the bell crank lever carrying said roller is bodily moved away from its co-operating forming wheel 10 or out of forming position. This movement of wheel 13 allows the finished spherical body 44 to drop through the forming wheels into the conveying tube 45 by means of which it will be discharged from the machine through its discharge end 46. The tubes 45 are clamped to support plate 45ª which extends lengthwise of the machine and projects upwardly from the base 50.

The series of cams 36 are so arranged on shaft 33 that their indentations 43 operate the bell crank levers in a predetermined order of rotation causing the forming wheels 13 to move in the same predetermined order to discharge the finished spherical bodies.

Since the machine is primarily designed to form or mold spherical bodies such as marbles from plastic glass (although not limited to the use of such material) I have provided the machine with a distributor for leading or distributing individual gathers, gobs or drops of plastic glass to forming position between the wheels of the eight sets of co-operating forming wheels.

The distributor is carried by a support member or platform 47 mounted on standards 48—48 and 49 forming part of the framework of the machine. Standards 48 are supported on pedestals 12 which carry the bearings for shaft 11 while standard 49 is supported by base 50 within which motor 19 is housed. Secured to and depending from support member 47 are eight distributor tubes 51. The inlets 52 of said tubes are arranged in a circle within an annular flange 53 projecting upwardly from the distributor support member 47. The distributor tubes are bent at an easy curve so that each tube leads to the forming position between one pair of co-operating forming wheels.

In order that the drops, gobs or gathers of glass may be deposited by the gatherers or feeders at one point for all of the co-operating pairs of wheels, a rotating distributing head 54 is employed. This head is formed in the nature of an inclined tube 55 mounted so as to rotate about the axis of a vertical shaft 56, and is provided with an inlet opening 57 and a discharge opening at its lower end adapted to alternately register with the inlet openings 52 of the distributor tubes 51.

Vertical shaft 56 near its upper end is journaled within a bearing formed in downwardly projecting portion 58 of distributor support member 47. The upper end of the shaft is secured within member 56ª which serves as a standard for the distributor. At its lower end 59 shaft 55 is journaled within suitable bearings carried by the top member 60 of base 50. This shaft 55 near its lower end carries an eight tooth intermittent gear 61 which meshes with a two-tooth intermittent gear 62 carried on a vertical shaft 63. Shaft 63 is mounted in suitable bearings 64 carried by top 60 of base 50 and bearings carried in a gear cover 65 bolted to top 60. Shaft 63 on its upper end carries a crown pinion 66 which meshes with a crown gear 67 keyed to cam shaft 33.

Shaft 11 which carries the forming wheels 10 having fixed axes is axially movable within its bearings and the axial positions of the eight forming wheels 10 may be simultaneously adjusted by means of adjustment screws 68 and 69 which respectively bear against the opposite ends of shaft 11. The axial adjustment of forming wheels 10 with relation to forming wheels 13 to some extent has a bearing upon the diameter of the finished products (spherical bodies) molded by the sets of forming wheels. The initial size of the drop, gob or gather of plastic glass will also determine to a large extent the size of the finished product.

The principle of the machine or apparatus is applicable to machines for grinding spherical bodies from natural rock formations such as quartz, agate, etc. In such a grinding machine where a cutting material such as sand is used in conjunction with the forming wheels for grinding, it, of course, will be necessary to protect the bearings and other parts of the apparatus from the sand and dust formed during the grinding operation.

It will be apparent that plastic clay or porcelain mixes may be used in the machine as illustrated without modifying the same.

While I have described and illustrated but one embodiment of my invention, it will be apparent to those skilled in the art that various changes, additions, substitutions and omissions may be made in the apparatus illustrated without departing from the spirit and scope of the invention as set forth by the appended claims.

I claim as my invention:—

1. In a machine for making spherical bodies, a pair of rotating peripherally grooved co-operating forming wheels having angularly disposed axes.

2. In a machine for making spherical bodies, a pair of rotating peripherally grooved co-operating forming wheels of different peripheral speed and having angularly disposed axes.

3. In a machine for making spherical bodies, a pair of rotating peripherally grooved co-operating forming wheels having angularly disposed axes and means for directing material to forming position between said wheels.

4. In a machine for making spherical bodies, a pair of rotating peripherally grooved co-operating forming wheels of different peripheral speed having angularly disposed axes and means for directing material to forming position between said wheels.

5. In a machine for making spherical bodies, a pair of rotating peripherally grooved, co-operating forming wheels having angularly disposed axes and means for discharging finished articles therefrom.

6. In a machine for making spherical bodies, a pair of rotating peripherally grooved, co-operating forming wheels of different peripheral speed having angularly disposed axes and means for discharging finished articles therefrom.

7. In a machine for making spherical bodies, a pair of rotating peripherally grooved co-operating forming wheels having angularly disposed axes and means for bodily moving one of said wheels away from the other to discharge articles therefrom.

8. In a machine for making spherical bodies, a pair of rotating peripherally grooved co-operating forming wheels of different peripheral speed having angularly disposed axes and means for bodily moving one of said wheels away from the other to discharge articles therefrom.

9. In a machine for making spherical bodies, a pair of rotating peripherally grooved co-operating forming wheels of different peripheral speed and having angularly disposed axes, means for directing material to forming position between said wheels and means for discharging finished articles therefrom.

10. In a machine for making spherical bodies, a pair of rotary peripherally grooved co-operating forming wheels of different peripheral speed and having angularly disposed axes, means for leading material to forming position between said wheels and means for bodily moving one of said wheels away from the other to discharge the article therefrom.

11. In a machine for making spherical bodies, a pair of rotary peripherally grooved co-operating forming wheels of different peripheral speed and having angularly disposed axes, means for leading material to forming position between said wheels, a pivoted member supporting one of said wheels and means for swinging said pivoted member to bodily move the wheel supported by it away from the other wheel to discharge the article when formed.

12. In a machine for making spherical bodies, a pair of rotary peripherally grooved co-operating forming wheels of different peripheral speed and having angularly disposed axes, means for leading material to forming position between said wheels, a pivoted member supporting one of said wheels and a cam for swinging said member to bodily move the wheel supported by it away from the other wheel to discharge the article when finished.

13. In a machine for making spherical bodies, a pair of rotary peripherally grooved co-operating forming wheels of different peripheral speed and having angularly disposed axes, means for leading material to forming position between said wheels, a bell crank lever supporting one of said wheels, a cam for swinging said lever to bodily move the wheel supported by it away from the other wheel to discharge the article when finished.

14. In a machine for making spherical bodies, a pair of rotary peripherally grooved co-operating forming wheels of different peripheral speed and having angularly disposed axes, fixed bearings for one of said wheels movable bearings for the other wheel, means for periodically moving said movable bearings whereby the wheel supported thereby is bodily moved away from the other wheel and means for leading material to forming position between said wheels.

15. In a machine for making spherical bodies, a rotatably mounted peripherally grooved forming wheel having a fixed axis, another rotatably mounted peripherally grooved forming wheel adapted to co-operate therewith, having its axis disposed at an angle to the axis of said other wheel and bodily shiftable with relation thereto, a bell crank lever at one end carrying said shiftable wheel, a cam co-operating with the other end of said lever to periodically swing the same whereby the wheel carried by it is moved away from the other wheel and means for rotating said wheels at different peripheral speeds.

16. In a machine for making spherical bodies, a number of pairs of rotating peripherally grooved co-operating forming wheels of which the wheels of each pair have different peripheral speeds and axes angularly arranged one to the other and means for alternately distributing material to forming position between the co-operating wheels.

17. In a machine for making spherical bodies, a number of pairs of rotating peripherally grooved co-operating forming wheels of which the wheels of each pair have different peripheral speeds and axes angularly arranged one to the other, means for alternately distributing material to forming position between the co-operating wheels, and means for discharging finished articles.

18. In a machine for making spherical bodies, a number of axially aligned, peripherally grooved forming wheels, a corresponding number of peripherally grooved forming wheels co-operating therewith and having their axes angularly disposed with relation thereto, means for rotating the axially aligned wheels at a different peripheral speed than those having angularly disposed axes and means for alternately moving the wheels having angularly disposed axes bodily toward and from the axially aligned wheels.

19. In a machine for making spherical bodies, a number of pairs of co-operating peripherally grooved forming wheels one of each of which has a fixed axis and the other a shiftable axis with the axes of each pair angularly disposed one to the other, means for alternately leading material to forming position between the co-operating wheels, means for discharging finished articles and means for simultaneously shifting axially the wheels having fixed axes.

20. In a machine for making spherical bodies, a number of pairs of co-operating peripherally grooved forming wheels one of each of which has a fixed axis and the other a shiftable axis, with the axes of each pair angularly disposed one to the other, bell crank levers supporting the wheels with shiftable axes, a series of cams co-operating with said levers to alternately move the wheels having shiftable axes out of forming position, means for driving the wheels of each pair at different peripheral speeds and means for alternately distributing material to forming position between the co-operating wheels.

21. In a machine for making spherical bodies, a number of axially aligned, peripherally grooved forming wheels, a corresponding number of co-operating peripherally grooved forming wheels having their axes angularly disposed with relation thereto, means for rotating the axially aligned wheels at a different peripheral speed than those having angularly disposed axes, means for alternately moving the angularly disposed wheels bodily toward and from the axially aligned wheels, means for distributing material to said wheels and means for discharging material therefrom.

In testimony whereof, I have hereunto subscribed my name this 9th day of November, 1922.

H. M. JENKINS.